US009243946B2

(12) United States Patent
Gentner et al.

(10) Patent No.: US 9,243,946 B2
(45) Date of Patent: Jan. 26, 2016

(54) TRANSMISSION LEVEL GAUGE AND PROCESS FOR TRANSMISSIONS WITHOUT DIPSTICK

(71) Applicant: Bosch Automotive Service Solutions LLC, Warren, MI (US)

(72) Inventors: Adam Gentner, Huntington Beach, CA (US); Ray de Schepper, Norwalk, CA (US)

(73) Assignee: Bosch Automotive Service Solutions Inc., Warren, MI (US)

(*) Notice: Subject to any disclaimer, the term of this patent is extended or adjusted under 35 U.S.C. 154(b) by 134 days.

(21) Appl. No.: 14/089,099

(22) Filed: Nov. 25, 2013

(65) Prior Publication Data

US 2014/0144222 A1   May 29, 2014

Related U.S. Application Data

(60) Provisional application No. 61/730,052, filed on Nov. 26, 2012.

(51) Int. Cl.
| | |
|---|---|
| *G01M 13/02* | (2006.01) |
| *G01F 23/00* | (2006.01) |
| *G01F 23/16* | (2006.01) |
| *G01F 25/00* | (2006.01) |

(52) U.S. Cl.
CPC .......... *G01F 23/0053* (2013.01); *G01F 23/167* (2013.01); *G01F 25/0053* (2013.01)

(58) Field of Classification Search
None
See application file for complete search history.

(56) References Cited

U.S. PATENT DOCUMENTS

| | | | | |
|---|---|---|---|---|
| 4,558,520 | A * | 12/1985 | Forde, Jr. | 33/725 |
| 5,113,594 | A * | 5/1992 | Ishihara et al. | 33/722 |
| 2004/0211176 | A1 * | 10/2004 | Ito et al. | 60/487 |
| 2008/0314141 | A1 * | 12/2008 | Keith et al. | 73/290 R |

* cited by examiner

*Primary Examiner* — Andre Allen
(74) *Attorney, Agent, or Firm* — Baker & Hostetler LLP

(57) ABSTRACT

A transmission fill gauge system for a vehicle transmission includes a fill gauge assembly and a vacuum adapter assembly, wherein the vacuum adapter assembly and the fill gauge assembly are configured to be simultaneously in fluid communication with a transmission drain pan of the vehicle transmission. A method of measuring a transmission fluid level in a drain pan includes fluidly connecting a vacuum adapter assembly between a fill port of the vehicle transmission and a constant vacuum source, applying an internal vacuum pressure to the drain pan via a constant vacuum source, removing a drain plug from a drain on the drain pan, attaching a fill gauge assembly to the drain, the fill gauge assembly having a primary fluid tube slidably mounted in an elongated body portion, sliding the primary fluid tube to a predetermined position, and discontinuing the internal vacuum pressure to the drain pan by closing the valve.

20 Claims, 10 Drawing Sheets

TRANSMISSION LEVEL GAUGE AND PROCESS FOR TRANSMISSIONS WITHOUT DIPSTICK

FIELD OF THE DISCLOSURE

The disclosure generally relates to transmissions and, in particular, to a transmission fluid level gauge and vacuum adapter and a process for monitoring transmission fluid levels in transmission systems lacking a dipstick.

BACKGROUND OF THE DISCLOSURE

Many Original Equipment Manufacturers (OEMs) have removed the dipsticks from their transmissions to save on cost and remove a potential source of water intrusion into the transmission. Due to this redesign, the process for checking the transmission fluid level on many of these transmissions can be complex and time consuming. In particular, transmissions today typically have an elevated drain tube in the transmission oil pan that will drain any excess transmission fluid above the intended fluid level. To determine if the fluid level is adequate in the transmission after a transmission or transmission component fix or replacement, or to check and/or refill the transmission fluid level after maintenance or monitoring, for example, a technician must first open the transmission drain plug. If there is an absence of draining transmission fluid upon opening the drain plug, transmission fluid is added through the refill port until the fluid fills the transmission oil pan above the level of the elevated drain tube. At that point, the transmission fluid will drain through the drain tube, allowing the technician to physically see, by way of the draining fluid, that the appropriate amount of transmission fluid is present in the transmission.

For the above method of determining the transmission fluid level to be most effective, and to maintain the safety of those inspecting the transmission, it is necessary that the transmission fluid be at or near a predetermined inspection temperature (e.g., 100° F.). The problem, from a technician's standpoint, for example, is that rarely vehicles requiring inspection and/or monitoring of the transmission fluid level are at the necessary temperature. Thus, long periods of time must be allocated to allow the transmission fluid to cool from an operating temperature of approximately 200° F. to the inspection temperature.

Transmission fluid levels are normally only checked due to a customer complaint about the operation of the vehicle, such as rough shifting, for example, which can often be the result of an improperly maintained transmission fluid level, whether too high or too low. However, when the customer takes their car into a service station for maintenance, the customer does not expect to be without their vehicle for several hours or more while waiting for the transmission fluid to cool to the required inspection temperature. A transmission level gauge and procedure are needed that will eliminate the downtime associated with waiting for the transmission fluid to cool. The present disclosure is directed to a transmission level gauge and methods for monitoring and/or replacing the transmission fluid in a transmission while the fluid is in an operating temperature range. The gauge is designed to prevent exposure of the technician to the hot transmission fluid, allowing for a safe and efficient means for checking and/or establishing the transmission fluid level in a transmission at operational temperatures.

SUMMARY OF THE DISCLOSURE

The foregoing needs are met by the present disclosure, wherein according to certain aspects, a transmission fill gauge system for a vehicle transmission includes a fill gauge assembly and a vacuum adapter assembly, wherein the vacuum adapter assembly and the fill gauge assembly are configured to be simultaneously in fluid communication with a transmission drain pan of the vehicle transmission.

In accordance with yet other aspects of the present disclosure, a method of measuring a transmission fluid level in a drain pan for a vehicle transmission includes fluidly connecting a vacuum adapter assembly between a fill port of the vehicle transmission and a constant vacuum source, wherein the vacuum adapter assembly includes a valve for controlling a vacuum applied to the drain pan by the constant vacuum source, applying an internal vacuum pressure to the drain pan via the constant vacuum source, removing a drain plug from a drain on the drain pan, attaching a fill gauge assembly to the drain, the fill gauge assembly having a primary fluid tube slidably mounted in an elongated body portion, sliding the primary fluid tube to a predetermined position in relation to the elongated body portion, and discontinuing the internal vacuum pressure to the drain pan by closing the valve.

In accordance with yet other aspects of the present disclosure, a transmission fill gauge system measures a transmission fluid level in a transmission drain pan having an overflow tube extending internally a predetermined height from a transmission drain. The system includes a fill gauge assembly having an insertion adapter for coupling the fill gauge assembly to the drain pan, the insertion adapter having a central lumen provided therethrough, an elongated body portion and a primary fluid tube slidably mounted in the elongated body portion, the elongated body portion being coupled to the insertion adapter so that at least a portion of the primary fluid tube is housed in the central lumen and configured to slidably extend beyond the predetermined height of the overflow tube. The system also includes a vacuum adapter assembly having a first port, a second port, a vacuum chamber in fluid communication with the first port and the second port, a stopcock valve configured to control fluid communication between the vacuum chamber and an external environment, a first vacuum hose configured to provide fluid communication from the first port to a fill port of the vehicle transmission, and a second vacuum hose configured to provide fluid communication from the second port to a constant vacuum source.

There has thus been outlined, rather broadly, certain aspects of the present disclosure in order that the detailed description herein may be better understood, and in order that the present contribution to the art may be better appreciated.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

Figure 1:
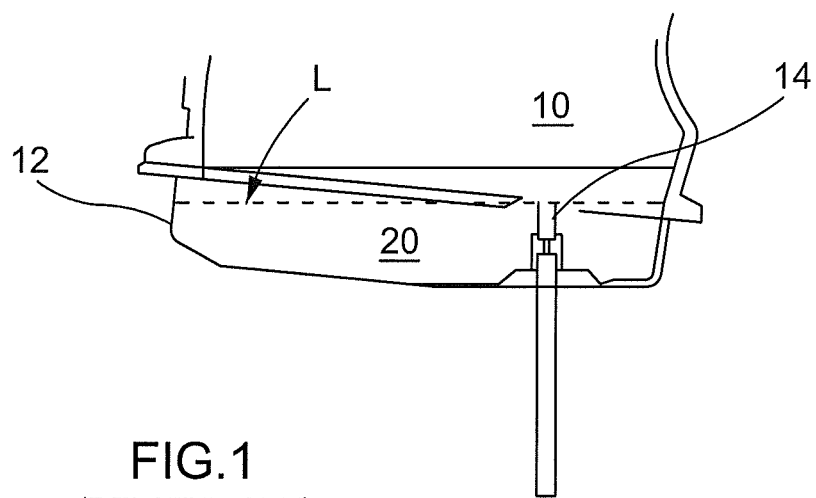
FIG. 1 is a side cutaway view of a related transmission drain pan assembly in a particular state of use.

Embodiments in accordance with the invention will now be described with reference to the drawing figures, in which like reference numerals refer to like parts throughout.

Various aspects of methods and tools for installation of a transmission fill gauge system may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of a transmission fill gauge system in addition to the orientation depicted in the drawings. By way of example, if aspects of methods and tools for a transmission fill gauge system shown in the drawings are turned over, elements described as being on the "bottom" side of the other elements would then be oriented on the "top" side of the other elements. The term "bottom" can, therefore, encompass both an orientation of "bottom" and "top" depending on the particular orientation of the apparatus.

FIG. 1 illustrates a typical process for measuring the fluid level in a conventional transmission assembly 10 having no dipstick. The transmission assembly has a transmission oil pan 12 with an elevated overflow tube 14 that extends upwards from the bottom of the oil pan 12 to a specified level (L) inside the oil pan 12. The oil pan 12 serves as the reservoir for transmission fluid 20 that is circulated through the various components of a transmission assembly. The overflow tube 14 may be configured to extend a certain height into the interior of the oil pan 12, i.e., to the specified level (L), based on the thermal properties of the recommended transmission fluid 20. For example, calibrated testing may determine the specified level (L) in the oil pan 12 when the transmission fluid 20 is heated to be within the inspection temperature range. The overflow tube 14 may then be configured to extend into the oil pan 12 to a height that is equal to or approximately equal to the specified level (L). A drain plug (not shown) is installed and tightened to a specific torque to prevent the transmission fluid 20 in the pan 12 from draining through the overflow tube 14 during operation. A fill port (not shown) is also provided to allow a technician to add transmission fluid 20 to the pan 12, as needed.

To determine the adequacy of the fluid level in the conventional transmission assembly 10, the temperature of the fluid 20 must first be determined, such as by way of a fluid temperature sensor that relays the temperature via a set signal to the technician. For example, in some vehicles, a series of specified movements of the shift lever, such as movement of the shift lever back and forth between Neutral (N) and Drive (D) at 1.5 second intervals for 6 seconds, will trigger the vehicle to enter the fluid temperature detection mode. When the fluid temperature detection mode is activated, the temperature sensor relays a signal to the onboard computer to activate the D shift indicator light in a certain manner, wherein the D shift indicator light may be off, for example, to indicate that the temperature of the transmission fluid is below the inspection temperature range, on to indicate that the temperature is in the inspection temperature range, or blinking to indicate that the temperature is above the inspection temperature range. If the system indicates that the temperature of the transmission fluid 20 is out of the inspection temperature range, the technician must either operate the vehicle to warm the fluid up or turn the vehicle off to allow the fluid to cool until the temperature comes into the inspection temperature range.

Figure 2:
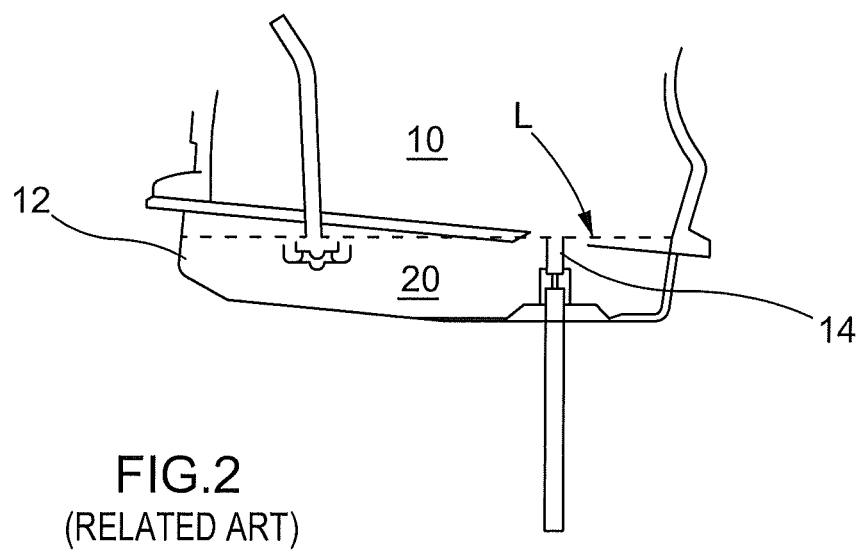
FIG. 2 is a side cutaway view of a related transmission drain pan assembly in a particular state of use.

Once it is indicated that the transmission fluid 20 is in the inspection temperature range, e.g., 100-105° F., the technician may turn off the vehicle, open the fill port, and remove the drain plug. As shown in FIG. 1, if the fluid level is above the preferred level L, transmission fluid 20 will immediately drain through the overflow tube 14 and into a collecting container placed underneath for collection and disposal of the overflow fluid. As shown in FIG. 2, if the fluid level is low, i.e., below the preferred level L of the overflow tube 14, no fluid 20 will drain through the overflow tube 14 upon removal of the drain plug. The technician then adds fluid through the fill port until the level rises above the overflow tube 14 and begins to drain through the overflow tube 14. The technician will wait for the excess transmission fluid 20 to drain and then replace the drain plug. In some cases, the fluid will once again be brought up to the inspection temperature range so that the technician may repeat the process to ensure that the transmission fluid level at the inspection temperature range is not above the preferred level L.

Figure 3:
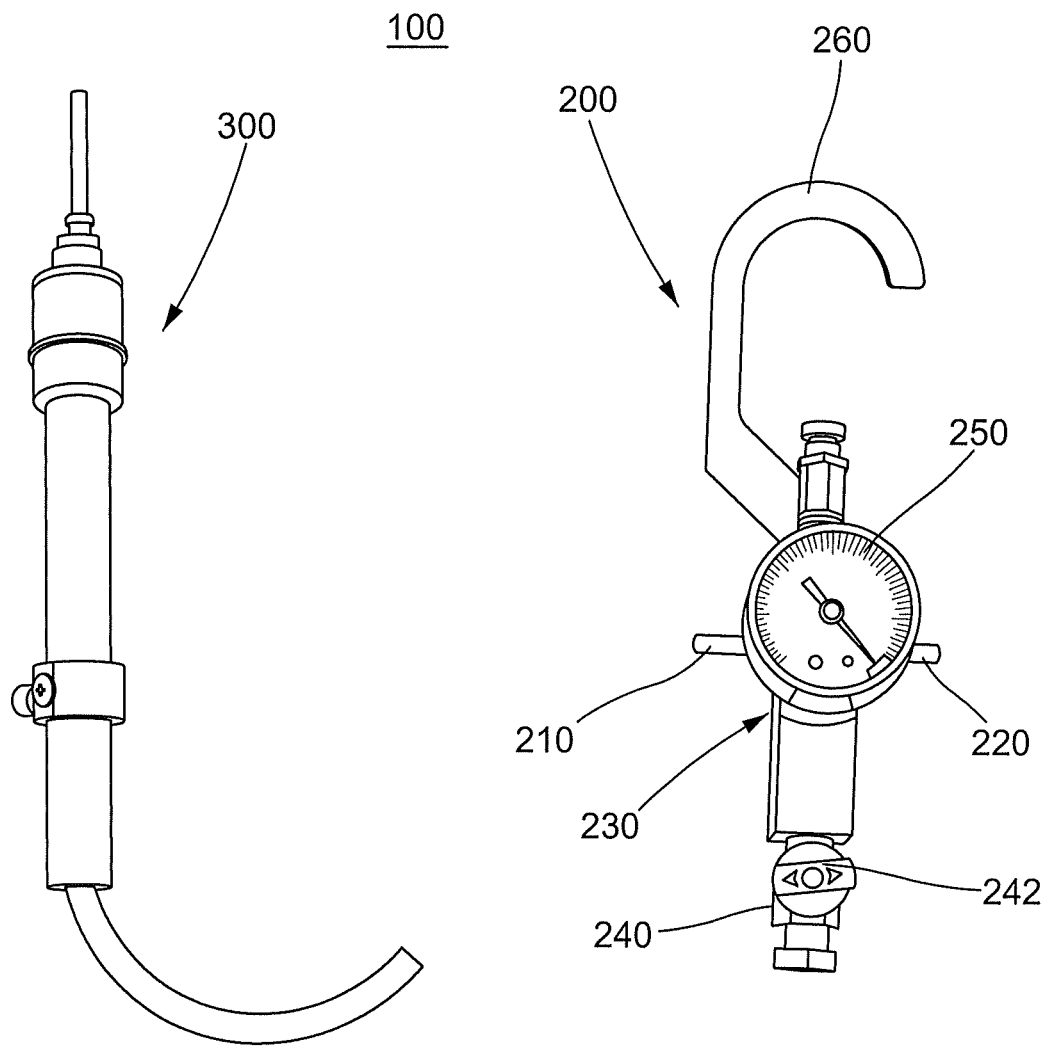
FIG. 3 illustrates components of a transmission fill gauge system in accordance with aspects of the present disclosure.

As shown in FIG. 3, the transmission fill gauge system 100 of the present disclosure includes a vacuum adapter assembly 200 and a fill gauge assembly 300. The vacuum adapter assembly 200 has a first port 210 and a second port 220 extending from a vacuum chamber 230. A stopcock valve 240 allows or prevents communication between the external environment and the interior of the vacuum chamber 230. A vacuum pressure gauge 250 provides a visible indicator of the internal vacuum pressure of the vacuum chamber 230 at the junction of the first port 210, second port 220, and the stopcock valve 240. In another embodiment, the pressure gauge 250 may be digital instead of analog (as shown). When the stopcock valve 240 is open, via a predetermined rotation in a first direction of a knob 242, for example, the vacuum chamber 230, and hence the first port 210 and second port 220, are exposed to the pressure of the external environment, typically atmospheric pressure. When the valve 240 is closed, via rotation of the knob 242 in an opposite or second direction, for example, the vacuum pressure gauge 250 provides a visible indication of the pressure of the fluid in the path created by the first port 210 and the second port 220. A body portion 260 of the vacuum adapter assembly 200 may be formed in the shape of a hanger, for example, to allow easy mounting of the vacuum adapter assembly 200 during a transmission maintenance procedure.

Figure 4:
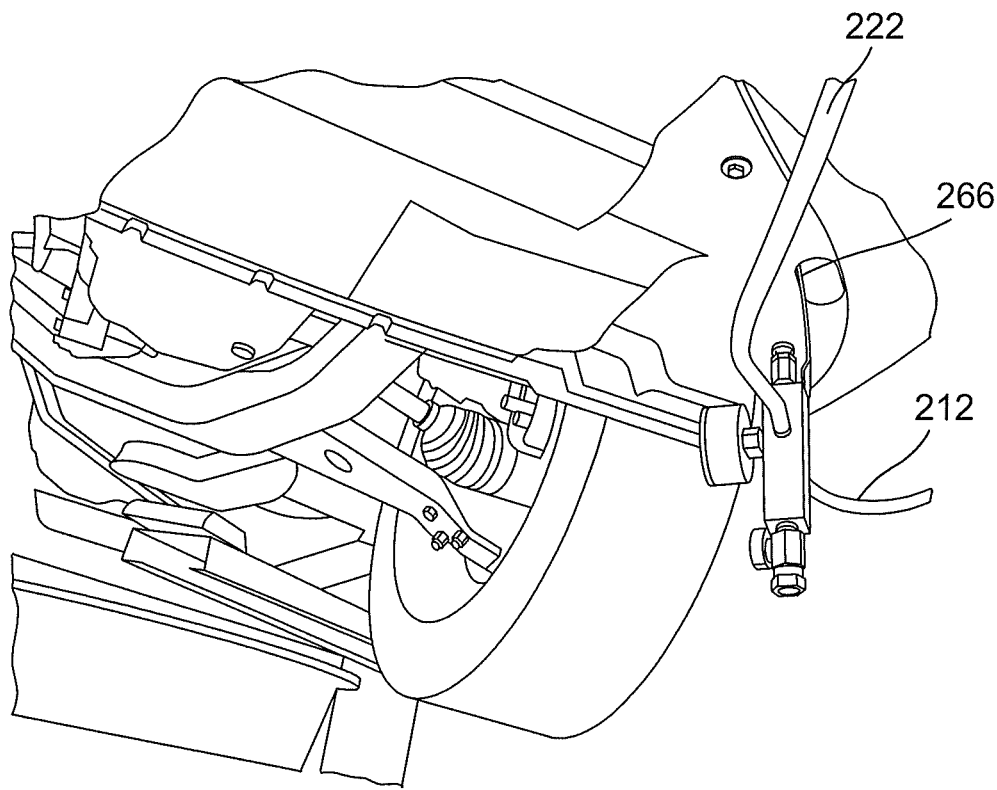
FIG. 4 illustrates components of a transmission fill gauge system in accordance with aspects of the present disclosure.
Figure 5:
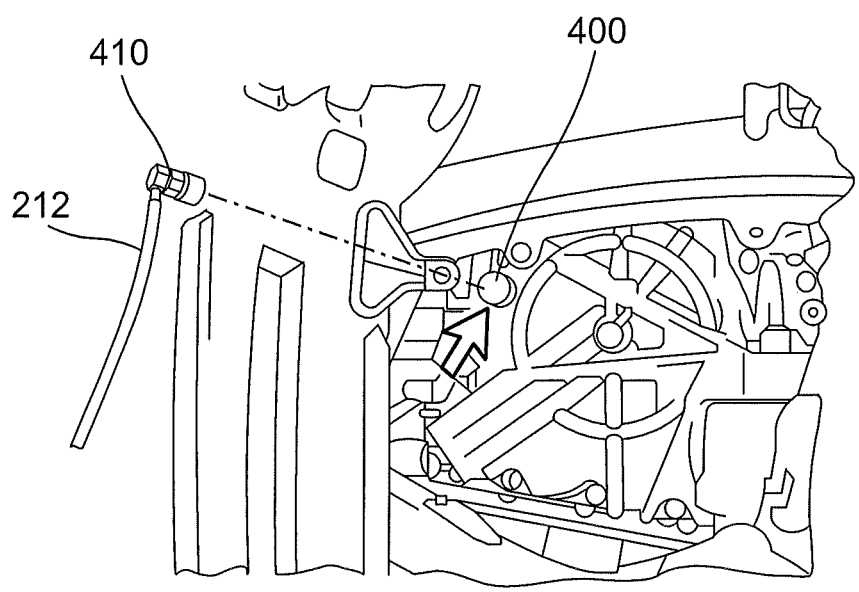
FIG. 5 illustrates components of a transmission fill gauge system in accordance with aspects of the present disclosure.

As shown in FIG. 4, the vacuum adapter assembly 200 may be mounted to the underside of a vehicle using the body portion 260. A first vacuum hose 212 may be connected to the first port 210 and a second vacuum hose 222 connected to the second port 220. The first vacuum hose 212 may be used to provide fluid communication between the first port 210 and a fill port of the transmission. For example, as shown in FIG. 5, a fill port plug may be removed from the fill port 400 and a threaded 90° fill port adapter 410 may be inserted therein. A quick connect fitting on one end of the first vacuum hose 212 may be configured to connect to the fill port adapter 410. In accordance with aspects of the present disclosure, the adapter 410 may be configured with a flow valve that can allow (when opened) or constrict (when closed) the flow between the first vacuum hose 212 and the fill port 400.

Referring back to FIG. 4, the distal end of the second vacuum hose 222 may be connected to a constant vacuum source on the engine, which may be via a plug on the manifold or a power brake vacuum hose, for example. Thus, with the engine running, a vacuum pressure may be applied to the interior of the transmission drain pan 422 (see FIG. 6) via the vacuum created by the engine and communicated to the drain pan 422 through the second vacuum hose 222, the vacuum adapter assembly 200, and the first vacuum hose 212. The stopcock valve 240 on the vacuum adapter assembly 200 may be used to control the vacuum pressure applied to the drain pan 422 to be within a predetermined range, such as between 2 to 4 inches Hg. However, other ranges are also contemplated such as 1 or 5-8 inches of Hg. The vacuum pressure gauge 250 may be used to monitor the vacuum pressure.

In accordance with yet other aspects of the present disclosure, the second vacuum hose 222 may be connected to a vacuum source completely separate from the vehicle to supply the necessary vacuum pressure to the interior of the transmission.

Figure 6:
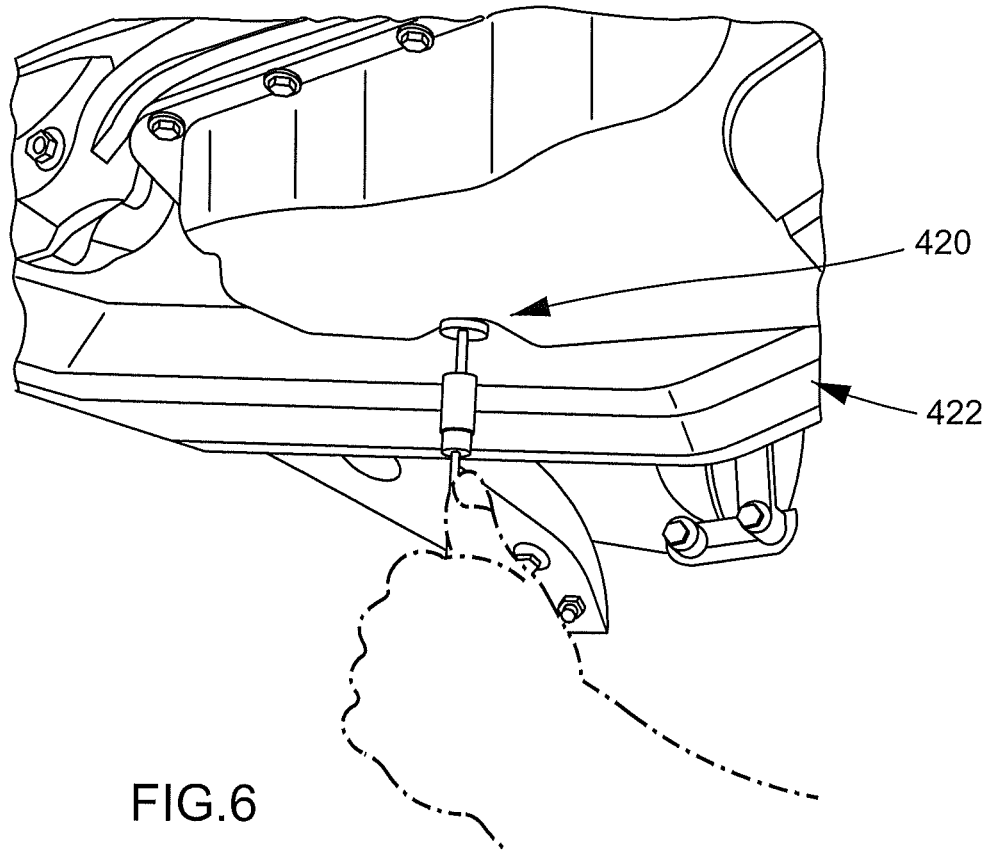
FIG. 6 illustrates aspects of a transmission fluid level monitoring and/or fill procedure in accordance with aspects of the present disclosure.
Figure 7:
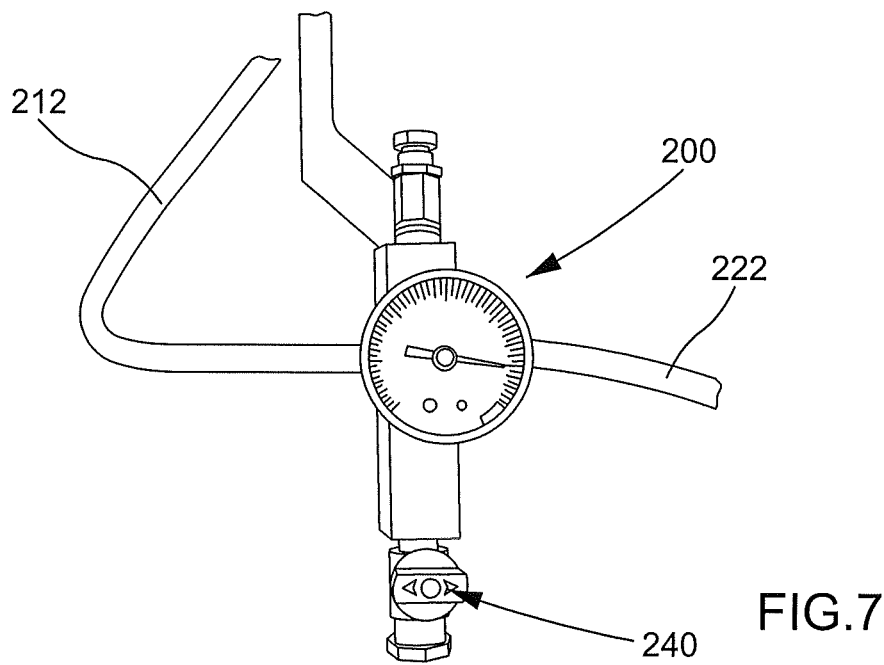
FIG. 7 illustrates components of a vacuum adapter assembly in accordance with aspects of the present disclosure.
Figure 8:
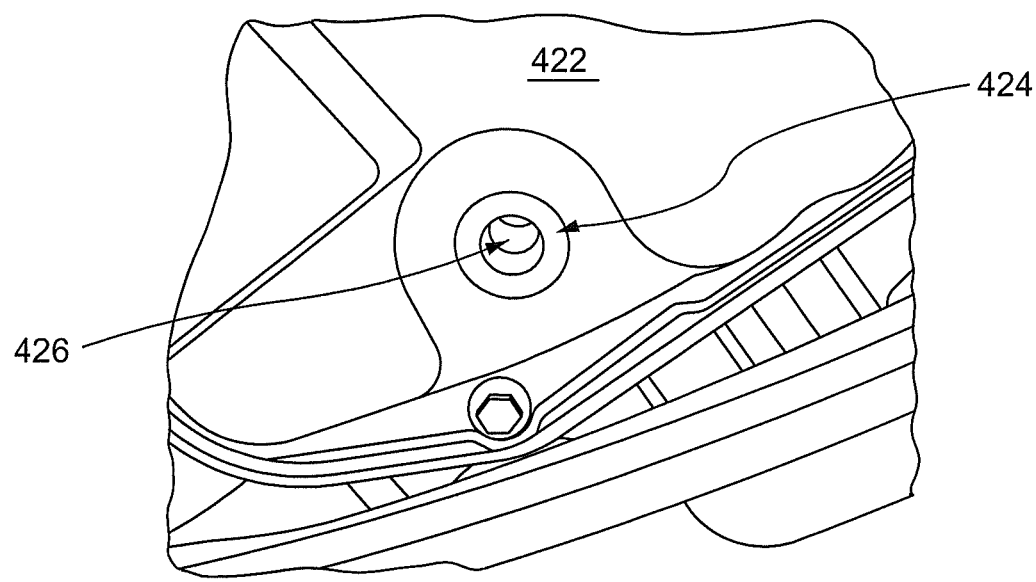
FIG. 8 illustrates components of a transmission drain pan in accordance with aspects of the present disclosure.

With a vacuum source path established to the drain pan 422, the stopcock valve 240 (and an adapter valve if provided) may be initially closed to the transmission, e.g., open to atmosphere, to prevent a vacuum pressure from being applied to the interior of the drain pan 422. As shown in FIG. 6, this permits a drain plug 420 located on the drain pan 422 of the transmission to be more easily loosened. With the drain plug 420 loosened, yet still in place to prevent any possible fluid drain, as shown in FIG. 7 the stopcock valve 240 (and an adapter valve if provided) may be opened in order to apply the vacuum pressure to the interior of the transmission drain pan 422. As shown in FIG. 8, with the vacuum applied to the transmission drain pan 422 via the vacuum adapter assembly 200, the drain plug 420 may be completely removed with the engine running. The vacuum pressure applied to the interior of the transmission drain pan 422 prevents leaking of any transmission fluid through the drain 424 in the event that the level of the transmission fluid is above the overflow tube 426 extending up into the drain pan 422. Thus, even if the temperature of the transmission fluid 20 is above the inspection temperature range, such that a level of the thermally expanded transmission fluid 20 is above the specified level (L), the vacuum applied to the interior of the transmission drain pan 422 prevents transmission fluid 20 from flowing out of the drain pan 422 through the overflow tube 426. Aspects of the present disclosure thus free the technician from having to wait for the transmission fluid 20 to fall within the inspection temperature range. As long as the temperature of the transmission oil 20 has achieved a minimum recommended temperature value, such as the temperature value at the lower end of the inspection temperature range, the transmission oil level may be measured. Because most vehicles brought into a service station for inspection have been running for some period of time, being able to measure the transmission oil level at temperatures above the recommended inspection temperature range may result in a significant reduction in service time that is typically attributed to waiting for the transmission oil 20 to cool down to the inspection temperature range.

Figure 9:
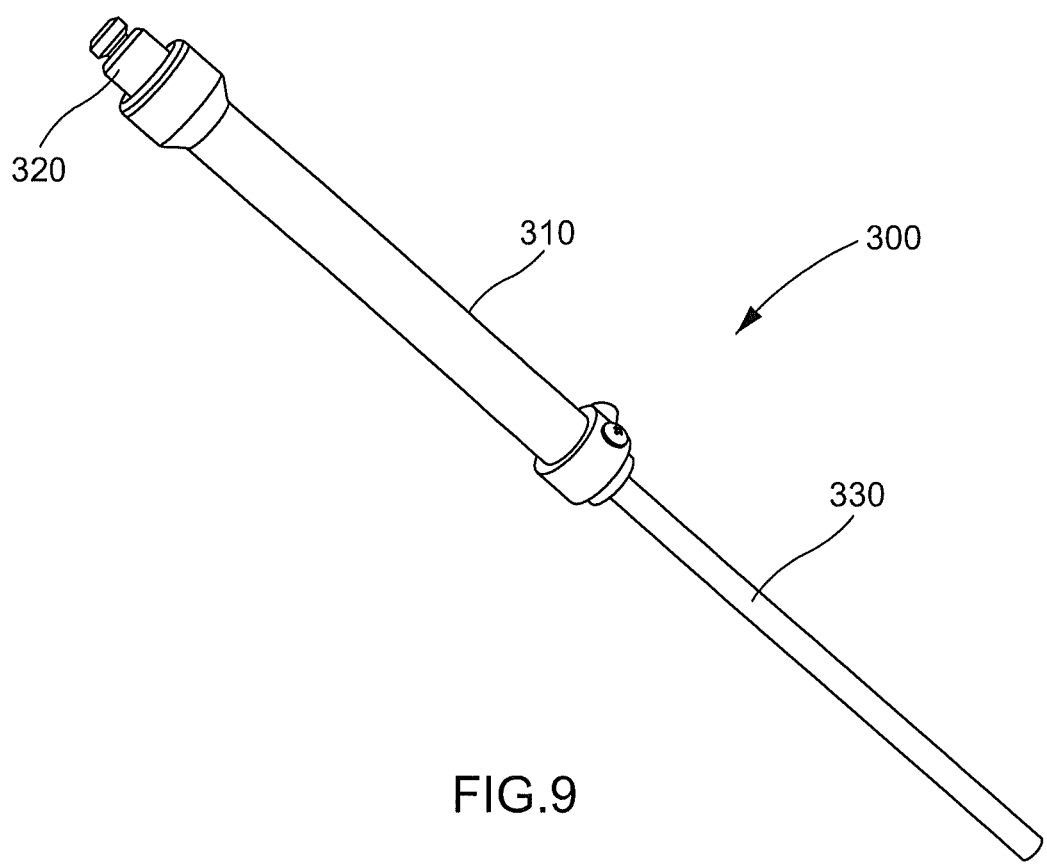
FIG. 9 is a perspective view of a fill gauge assembly in accordance with aspects of the present disclosure.
Figure 10:
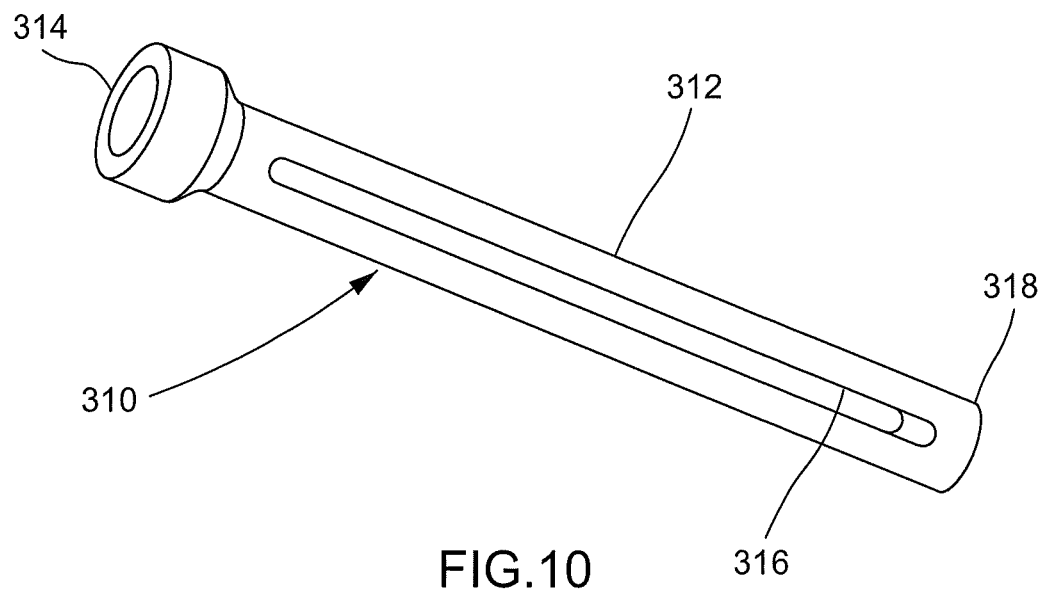
FIG. 10 is a perspective view of a main body component of the fill gauge assembly in accordance with aspects of the present disclosure.

With the drain plug 420 thus removed, and an internal vacuum pressure applied to the transmission oil pan 422, the fill gauge assembly 300 may be installed. As shown in FIG. 9, the fill gauge assembly 300 comprises a main body 310, an insertion adapter 320, and a fluid tube assembly 330. FIG. 10 illustrates that the main body 310 may be a hollow cylindrical tube having an elongated longitudinal portion 312 and a concentric collar portion 314. At least one longitudinal channel guide 316 may be formed through a wall of the elongated longitudinal portion 312 extending from near the concentric collar portion 314 to near a base 318 of the longitudinal portion 312.

Figure 11:
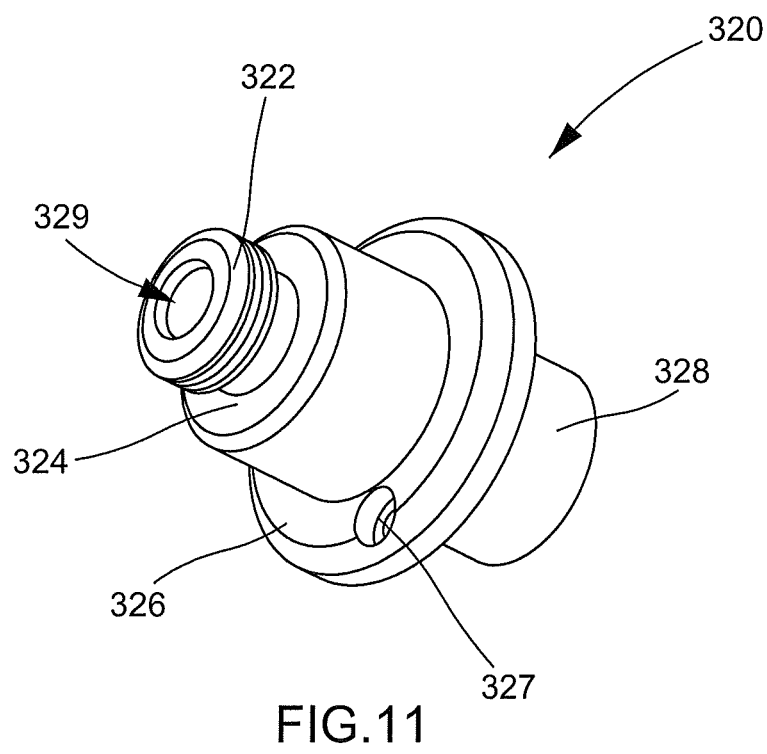
FIG. 11 is a perspective view of a insertion adapter component of the fill gauge assembly in accordance with aspects of the present disclosure.
Figure 12:
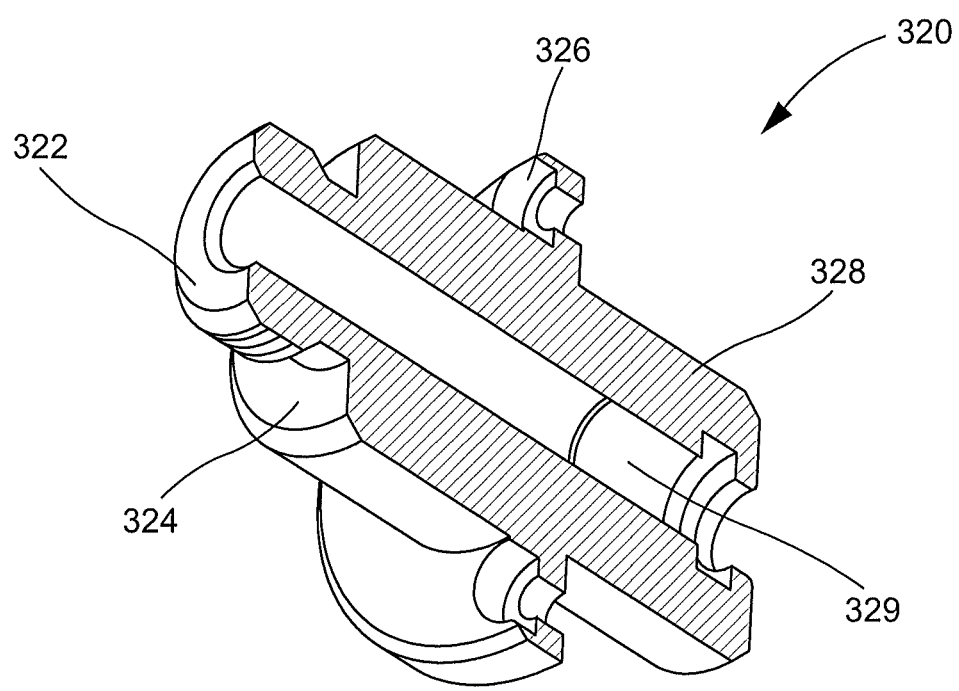
FIG. 12 is a cross-sectional view of a insertion adapter component of the fill gauge assembly in accordance with aspects of the present disclosure.

FIG. 11 is a close-up illustration of the insertion adapter 320. The insertion adapter 320 may have a threaded head portion 322 for attaching the fill gauge assembly 300 to the drain 424 of the drain pan 422. A main body portion 324 has an upper surface for seating the adapter 320, and thus the fill gauge assembly 300, against the drain pan 422. A skirt 326 having holes 327 for attaching the insertion adapter 320 to the collar portion 314 of the main body 310 via a suitable attachment means, such as screws, may be provided. A lower boss 328 may be provided for securely fitting the adapter 320 into the collar portion of the main body 310. In accordance with yet another aspect of the present disclosure, the lower boss 328 may be formed with external threads and the collar portion 314 internally threaded for mating the adapter 320 to the main body 310. As shown more clearly in the cross-section of FIG. 12, a central lumen 329 is formed through the entire interior of the adapter 320.

Figure 13:
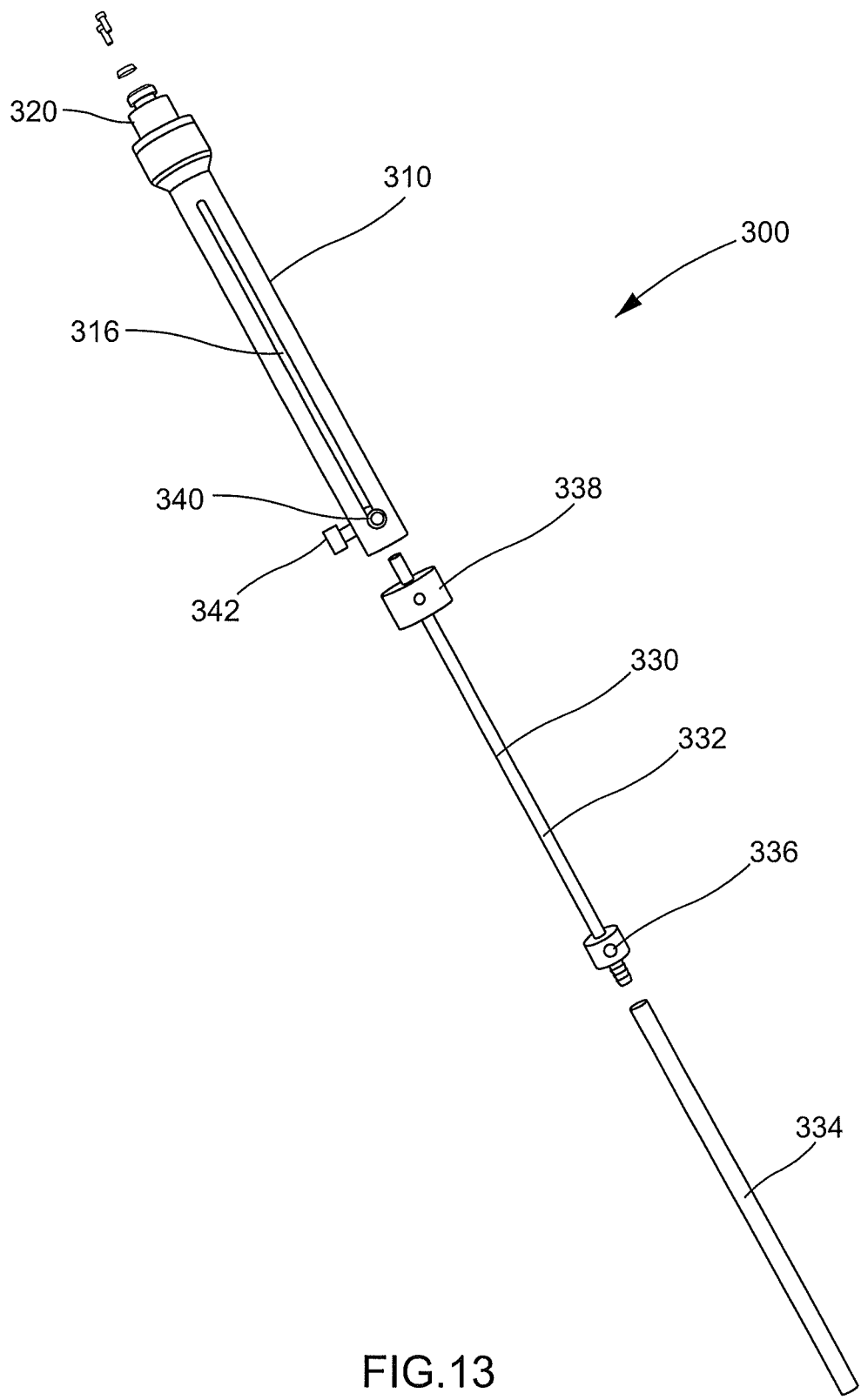
FIG. 13 is an exploded view of a fill gauge assembly in accordance with aspects of the present disclosure.

FIG. 13 is an exploded view of the fill gauge assembly 300. The fluid tube assembly 330 comprises a primary fluid tube 332 and a drain tube extension 334. The primary fluid tube 332 has a connection hub 336 with an outer diameter slightly less than or substantially equal to the inner diameter of the hollow main body 310. The connection hub 336 is attached to an outer slide collar 338 via suitable connection devices 340, such as screws, that extend through the longitudinal channel guides 316 formed in the main body 310. The fluid tube assembly 330 may thus be slidably mounted into the main body 310 with the primary fluid tube 332 extending through the main body and substantially through or completely through the insertion adapter 320. The drain tube extension 334 may be fitted onto the end of the primary fluid tube 332 to direct hot draining fluid properly into a container, if necessary.

Figure 14:
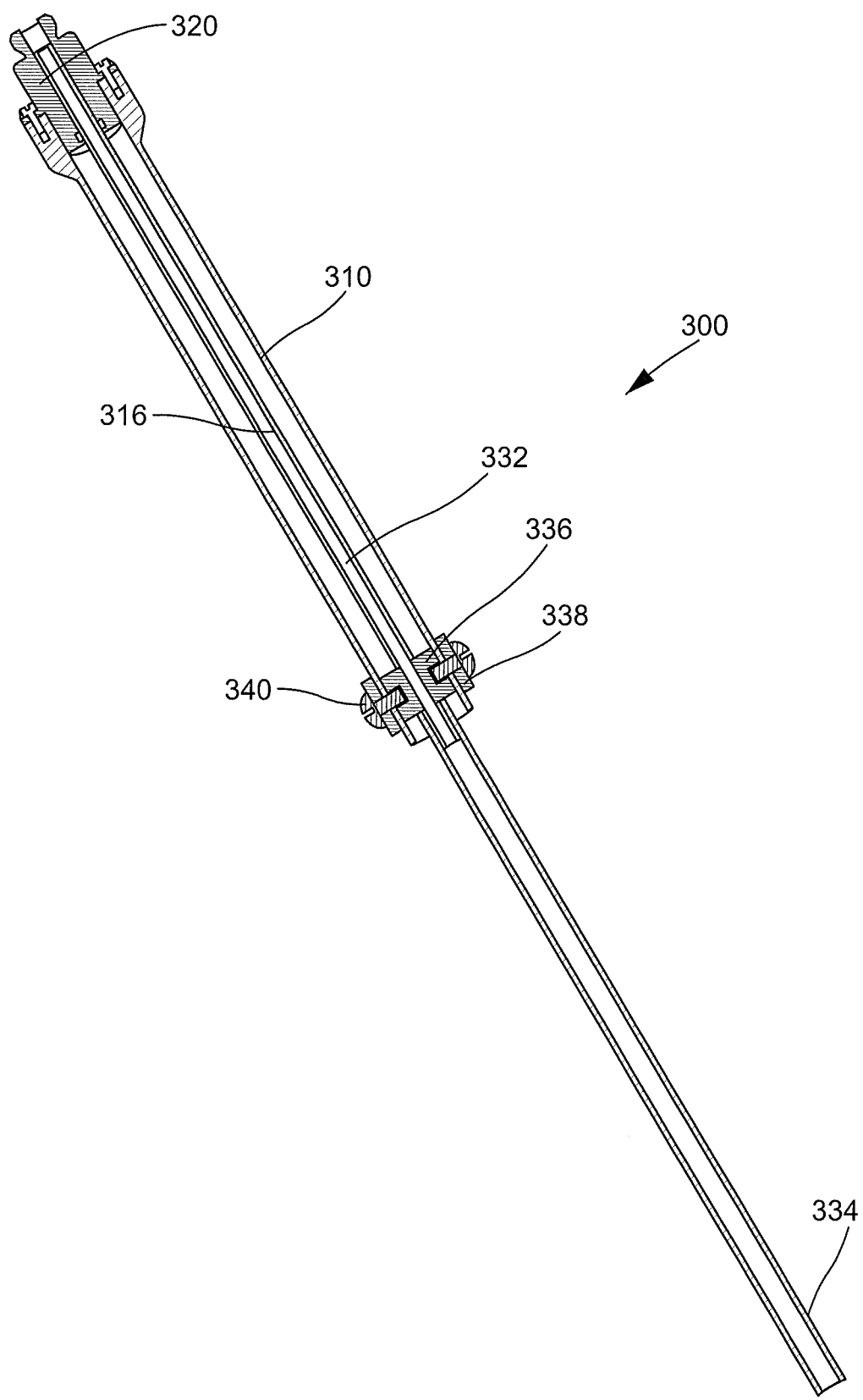
FIG. 14 is a cross-sectional view of a fill gauge assembly in accordance with aspects of the present disclosure.
Figure 15:
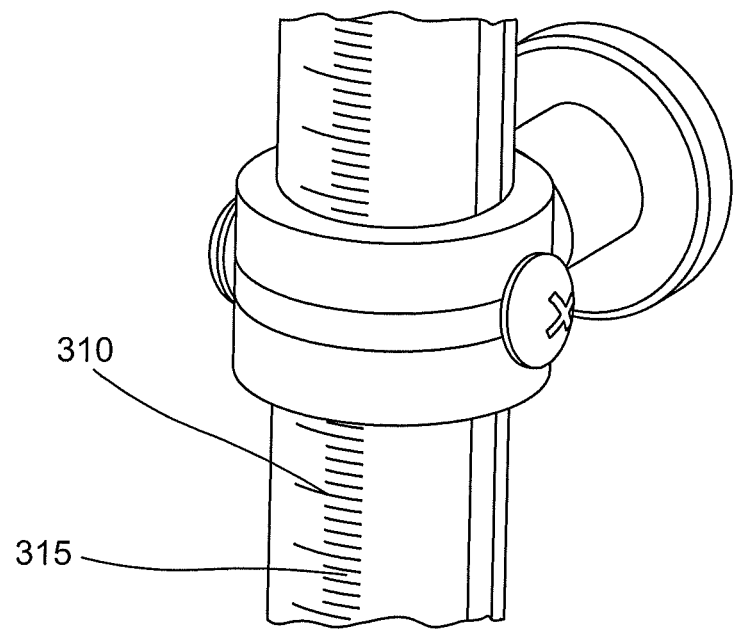
FIG. 15 is a close-up view of aspects of a fill gauge assembly in accordance with aspects of the present disclosure.

As shown in the cross-sectional view of FIG. 14, with the hub 336 and collar 338 situated in a lower most position, wherein the connection devices 340 abut a lower limit of the channel guides 316, the primary fluid tube 332 may extend substantially the entire longitudinal length of and be housed completely in the main body 310 and the insertion adapter 320. As seen in FIG. 13, a set screw 342 may be provided that extends through the slide collar 338 to abut a closed wall of the main body 310. By loosening and tightening the set screw 342, the slide collar 338, and by association the fluid tube assembly 330, may be advanced and/or locked into position along the entire longitudinal length of the channel guides 316. At an upper most limit, for example, the primary fluid tube 332 extends completely through the central lumen 329 and a distal end of the primary fluid tube 332 may extend a substantial distance outside of the insertion adapter 320. As shown in FIG. 15, the main body 310 may be provided with markings 315 to allow precise control and/or calibration of the length of extension of the primary fluid tube 332 beyond the insertion adapter 320.

Figure 16:
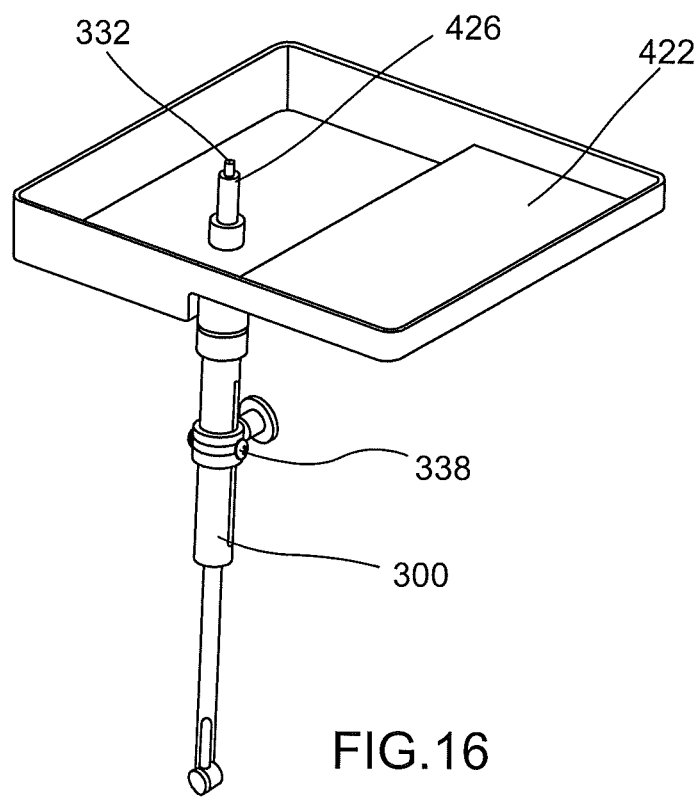
FIG. 16 is a perspective view of a fill gauge assembly in a mode of use in accordance with aspects of the present disclosure.

As described previously, with the engine still running and the drain plug 420 removed, the fill gauge assembly 300 may be connected to the drain pan 422 by screwing the insertion adapter 320 into the drain 424. As shown in FIG. 16, with the fill gauge assembly 300 thus seated against the bottom of the drain pan 422, the primary fluid tube 332 may be raised and locked to a set height above the overflow tube 426. The height that the primary fluid tube 332 should extend, and thus the height at which the slide collar 338 should be locked, may be predetermined according to, for example, a pre-calibrated setting for a particular temperature range of the transmission fluid in accordance with a particular make, model, and year of the vehicle. The primary fluid tube 332 thus acts as an extension to the overflow tube 426 to accommodate varied specified levels (L) of the transmission oil 20 in the drain pan 422 according to the real-time temperature of the transmission oil 20 when the procedure is performed. The procedure may thus be performed for transmission oil temperatures that are above the inspection temperature range for that particular vehicle. The effective height of the primary fluid tube 332 in the drain pan 422 may be 1-3 inches above the drain 424, for example, or any other amount desired.

Once the fill gauge assembly 300 is installed and set, a collection container may be placed below the transmission drain pan 422 to catch any hot transmission fluid. With the primary fluid tube 332 of the fill gauge assembly 300 thus set to a predetermined height, and the temperature of the fluid in the correct range for the respective height setting, the vacuum to the transmission may be turned off by closing the stopcock valve 240 and/or the adapter valve. If the fluid level in the drain pan 422 is above the preferred level for the temperature range indicated, the fluid will overflow into the primary fluid tube 332 extending into the drain pan 422 above the overflow tube 426, indicating that the transmission has been overfilled. Letting the fluid drain until it stops will set the transmission fluid level to the appropriate level. However, if fluid does not drain, the fill port adapter 410 must be removed from the fill port 400 and transmission fluid pumped into the fill port until fluid begins to drain out of the fill gauge assembly 300. Again, the fluid should be allowed to drain until it stops to set the fluid level to an appropriate level.

The first vacuum hose 212 may be reconnected to the fill port adapter 410 once the fill process is completed or it is determined that no fluid needs to be added to the transmission. The stopcock valve 240 should be opened (and/or the adapter valve as well) to reapply a vacuum pressure to the transmission drain pan 422. The vacuum pressure gauge 250 may be observed to ensure the pressure level is properly obtained. The primary fluid tube of 332 of the fill gauge assembly 300 may be retracted and the fill gauge assembly 300 detached and removed from the drain pan 422. Due to the internal vacuum pressure being maintained in the transmission drain pan 422, the transmission fluid 20 is prevented from draining through the drain. The drain plug 420 may then be inserted and torqued to the proper torque to close the drain 424. The vacuum adapter assembly 200 may be disconnected from the engine vacuum source and the adapter 410 removed from the fill port 400. The fill plug may be reinserted into the fill port and torqued to the proper torque.

It is to be understood that any feature described in relation to any one aspect may be used alone, or in combination with other features described, and may also be used in combination with one or more features of any other of the disclosed aspects, or any combination of any other of the disclosed aspects.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A transmission fill gauge system for a vehicle transmission, comprising:
    a fill gauge assembly; and
    a vacuum adapter assembly, wherein the vacuum adapter assembly and the fill gauge assembly are configured to be simultaneously in fluid communication with a transmission drain pan of the vehicle transmission and wherein the vacuum assembly is configured to provide an internal vacuum pressure to the transmission drain pan.

2. The transmission fill gauge system of claim 1, wherein the fill gauge assembly comprises an insertion adapter for coupling the fill gauge assembly to the drain pan, the insertion adapter having a central lumen provided therethrough.

3. The transmission fill gauge system of claim 2, wherein the fill gauge assembly further comprises an elongated body portion and a primary fluid tube slidably mounted in the elongated body portion, the elongated body portion being coupled to the insertion adapter so that at least a portion of the primary fluid tube is housed in the central lumen.

4. The transmission fill gauge system of claim 3, wherein the fill gauge assembly further comprises a connection hub fixedly mounted to the primary fluid tube and configured to slide inside of the elongated body portion.

5. The transmission fill gauge system of claim 4, wherein the fill gauge assembly further comprises an outer slide collar fixedly mounted to the connection hub via a connection device, the outer slide collar being configured to slide outside of the elongated body portion, and wherein the elongated body portion comprises a channel guide for accommodating the connection device during longitudinal movement of the primary fluid tube inside of the elongated body portion.

6. The transmission fill gauge system of claim 5, wherein the outer slide collar further comprises a securing device, the securing device configured to abut the elongated body portion to position a distal end of the primary fluid tube at a predetermined position in relation to the central lumen of the insertion adapter.

7. The transmission fill gauge system of claim 2, further comprising a drain tube extension configured to attach to a free end of the primary fluid tube.

8. The transmission fill gauge system of claim 1, wherein the vacuum adapter assembly comprises a first port, a second port and a vacuum chamber in fluid communication with the first port and the second port.

9. The transmission fill gauge system of claim 8, wherein the vacuum adapter assembly further comprises a stopcock valve configured to allow or prevent fluid communication between the vacuum chamber and an external environment.

10. The transmission fill gauge system of claim 9, wherein the vacuum adapter assembly further comprises a pressure gauge at a junction of the first port, the second port, and the stopcock valve, the pressure gauge being configured to provide a visible indication of an internal vacuum pressure of the vacuum chamber.

11. The transmission fill gauge system of claim 9, further comprising a first vacuum hose configured to provide fluid communication from the first port to a fill port of the vehicle transmission, and a second vacuum hose configured to provide fluid communication from the second port to a constant vacuum source.

12. The transmission fill gauge system of claim 11, wherein the constant vacuum source is an internal combustion engine.

13. A method of measuring a level of transmission fluid in a drain pan for a vehicle transmission, the method comprising:
fluidly connecting a vacuum adapter assembly between a fill port of the vehicle transmission and a constant vacuum source, wherein the vacuum adapter assembly includes a valve for controlling a vacuum applied to the drain pan by the constant vacuum source;
applying an internal vacuum pressure to an interior of the drain pan via the constant vacuum source;
removing a drain plug from a drain on the drain pan;
attaching a fill gauge assembly to the drain, the fill gauge assembly having a primary fluid tube slidably mounted in an elongated body portion;
sliding the primary fluid tube to a predetermined position in relation to the elongated body portion; and
discontinuing the internal vacuum pressure to the drain pan by closing the valve.

14. The method according to claim 13, further comprising:
disconnecting the vacuum adapter from the fill port if transmission fluid does not drain from the primary fluid tube when the vacuum is turned off to the drain pan; and
adding transmission fluid to the vehicle transmission through the fill port until transmission fluid drains through the primary fluid tube.

15. The method according to claim 13, further comprising: connecting a drain tube extension to the primary fluid tube.

16. The method according to claim 13, further comprising:
mounting a securing device on the elongated body portion of the fill gauge assembly to secure the primary fluid tube at the predetermined position in relation to the elongated body portion.

17. The method according to claim 16, further comprising:
measuring a temperature of the transmission fluid; and
based on the temperature, securing the primary fluid tube with the securing device at the predetermined position such that an end of the primary fluid tube extends into the interior of the drain pan further than an overflow tube of the drain pan extends into the interior.

18. The method of claim 13, further comprising:
providing calibration markings on the elongated body portion to mark the predetermined position of the primary fluid tube in relation to the elongated body portion.

19. A transmission fill gauge system for measuring a transmission fluid level in a transmission drain pan having an overflow tube extending internally a predetermined height from a transmission drain, the system comprising:
a fill gauge assembly comprising:
an insertion adapter for coupling the fill gauge assembly to the drain pan, the insertion adapter having a central lumen provided therethrough;
an elongated body portion; and
a primary fluid tube slidably mounted in the elongated body portion, the elongated body portion being coupled to the insertion adapter so that at least a portion of the primary fluid tube is housed in the central lumen and configured to slidably extend beyond the predetermined height of the overflow tube; and
a vacuum adapter assembly comprising:
a first port;
a second port;
a vacuum chamber in fluid communication with the first port and the second port;
a stopcock valve configured to control fluid communication between the vacuum chamber and an external environment;
a first vacuum hose configured to provide fluid communication from the first port to a fill port of the vehicle transmission; and
a second vacuum hose configured to provide fluid communication from the second port to a constant vacuum source.

20. The transmission fill gauge system of claim 19, wherein the vacuum adapter assembly and the fill gauge assembly are configured to be simultaneously in fluid communication with the transmission drain pan of the vehicle transmission.

* * * * *